Aug. 27, 1940.  J. H. JONES  2,212,778
WEDGE ADJUSTING MECHANISM FOR LOCOMOTIVE DRIVE BOXES
Filed June 7, 1939  4 Sheets-Sheet 1
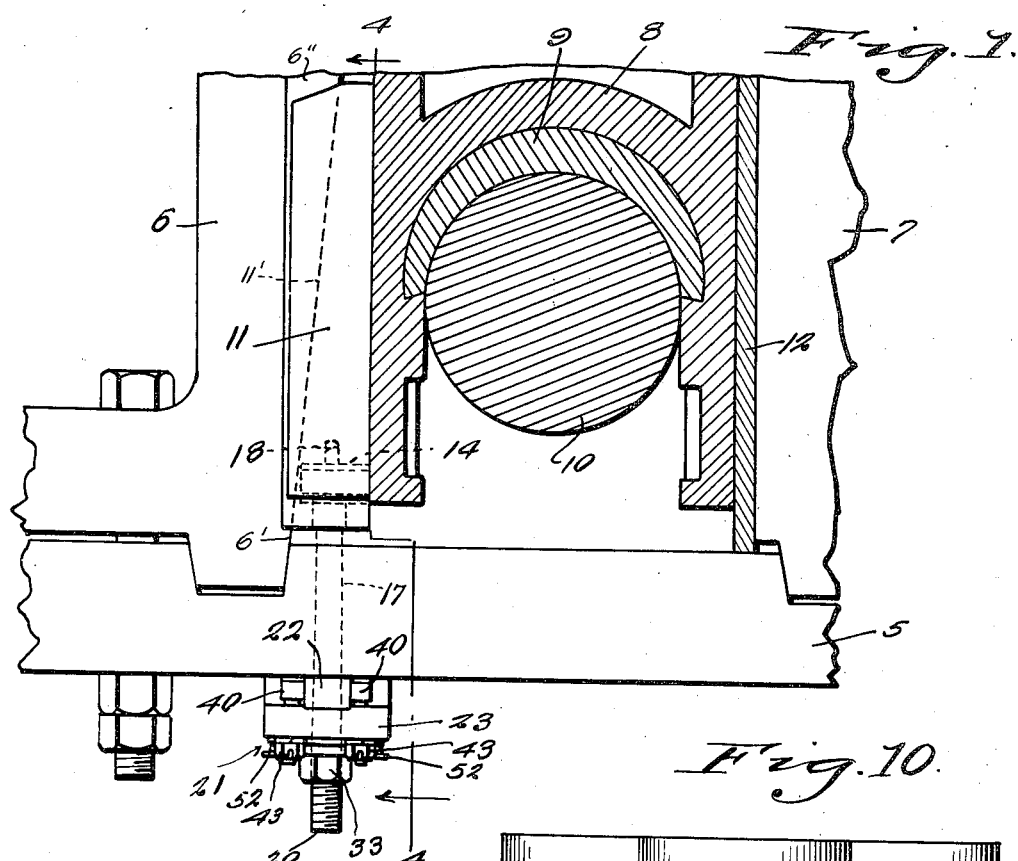
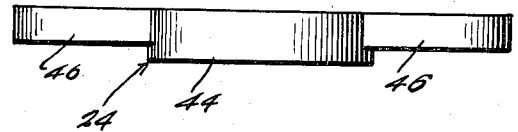
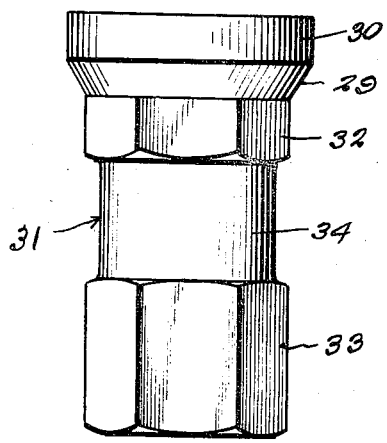
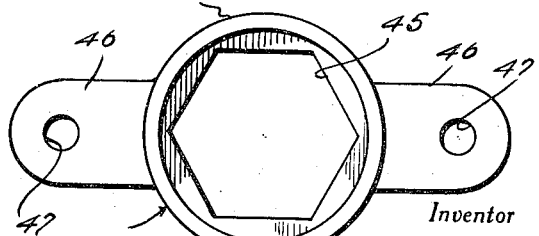
Inventor
Junius H. Jones
By Clarence A. O'Brien
and Hyman Berman
Attorneys Aug. 27, 1940.     J. H. JONES     2,212,778
WEDGE ADJUSTING MECHANISM FOR LOCOMOTIVE DRIVE BOXES
Filed June 7, 1939     4 Sheets-Sheet 2
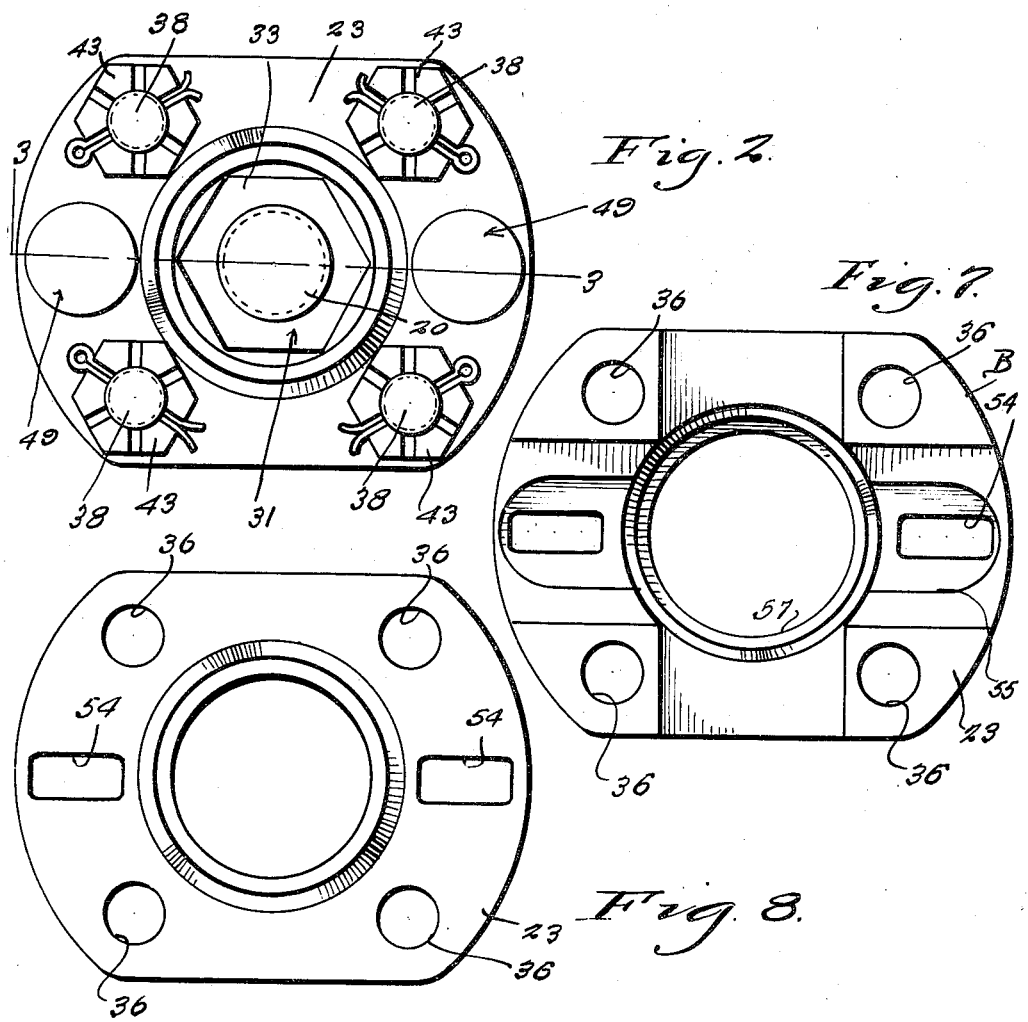
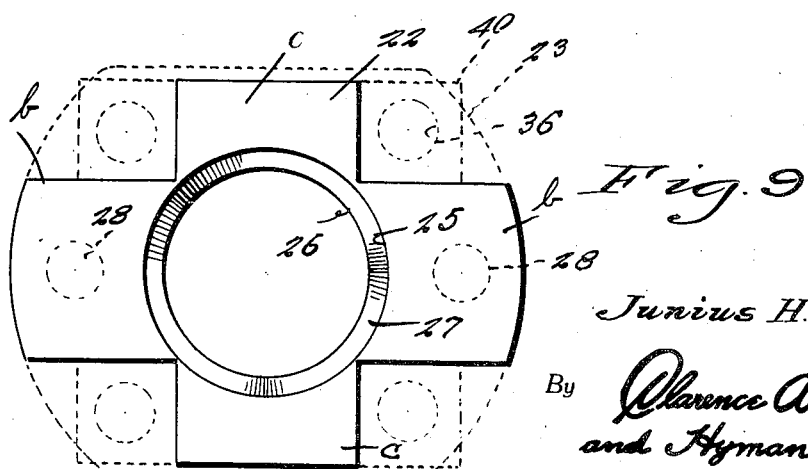
Inventor
Junius H. Jones
By Clarence A. O'Brien
and Hyman Berman
Attorneys Aug. 27, 1940.  J. H. JONES  2,212,778
WEDGE ADJUSTING MECHANISM FOR LOCOMOTIVE DRIVE BOXES
Filed June 7, 1939  4 Sheets-Sheet 3
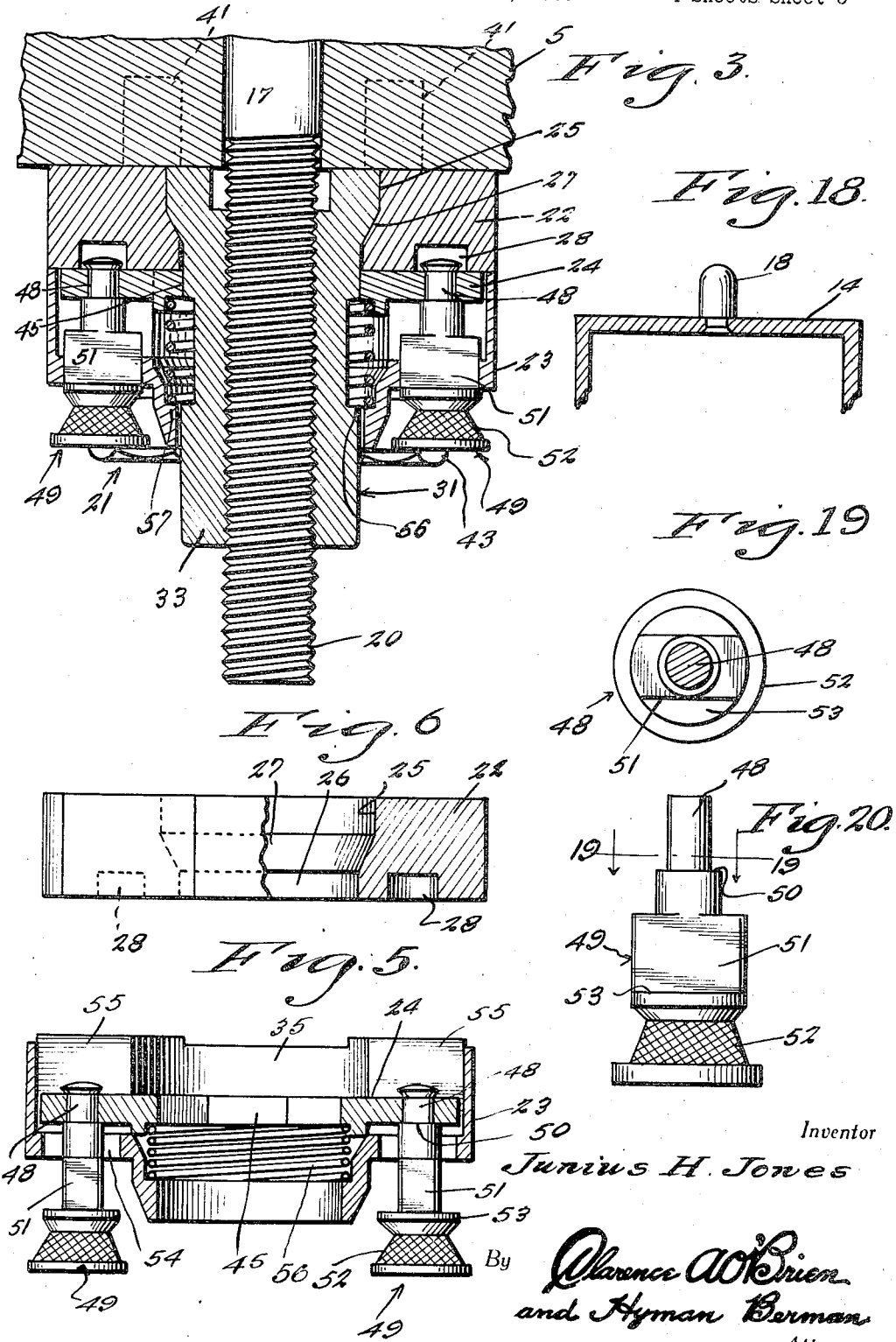
Inventor
Junius H. Jones
By Clarence A. O'Brien
and Hyman Berman
Attorneys Aug. 27, 1940.  J. H. JONES  2,212,778
WEDGE ADJUSTING MECHANISM FOR LOCOMOTIVE DRIVE BOXES
Filed June 7, 1939  4 Sheets-Sheet 4
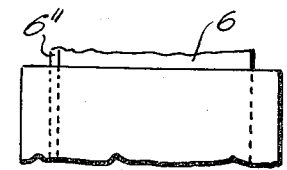
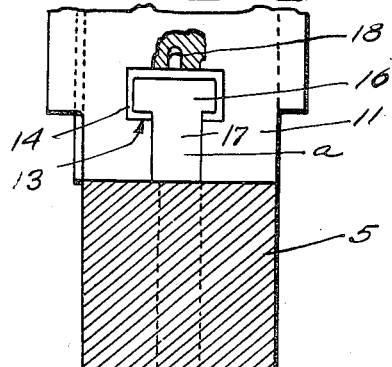
Fig. 4.
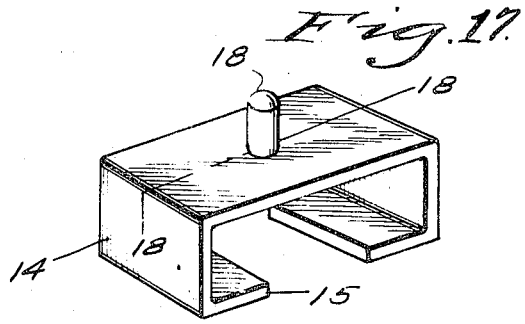
Fig. 17.
Fig. 16.
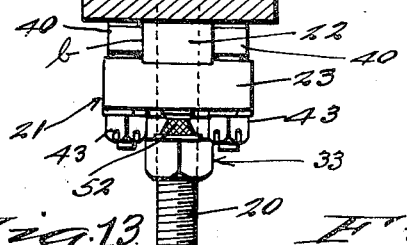
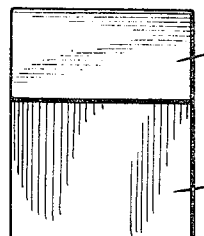
Fig. 13.
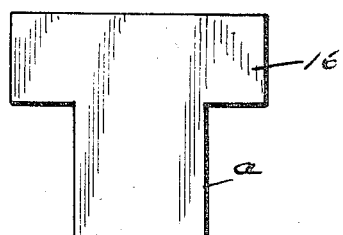
Fig. 14.
Fig. 15.
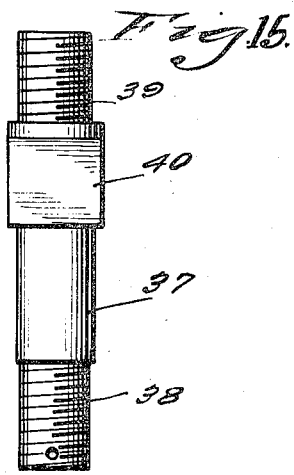
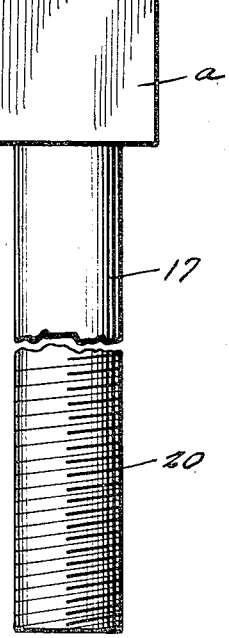
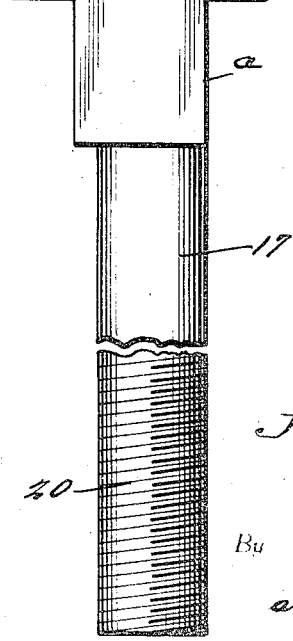
Inventor
Junius H. Jones
By Clarence A. O'Brien
and Hyman Berman
Attorneys Patented Aug. 27, 1940

2,212,778

UNITED STATES PATENT OFFICE 2,212,778

WEDGE ADJUSTING MECHANISM FOR LOCOMOTIVE DRIVE BOXES

Junius H. Jones, Atlanta, Ga.

Application June 7, 1939, Serial No. 277,927

6 Claims. (Cl. 308—66)

This invention appertains to new and useful improvements in bearing adjusting means and more particularly to adjusting means for locomotive drive boxes.

The principal object of the present invention is to provide adjusting means for locomotive drive boxes wherein the usual wedge can be adjusted and positively held in place against accidental or self-adjustments.

Another important object of the invention is to provide a detent for wedge-adjusting mechanisms of locomotive drive boxes wherein the detent serves to positively hold the wedge against displacement, but which can be readily actuated to adjust or release the wedge.

These and other objects and advantages of the invention will become apparent to the reader of the following specification:

In the drawings:

Figure 1 represents a fragmentary vertical sectional view through the drive box and showing in elevation the novel detent means.

Figure 2 is a bottom plan view showing the detent means.

Figure 3 is a fragmentary vertical sectional view.

Figure 4 is a sectional view taken substantially on line 4—4 of Figure 1.

Figure 5 is a fragmentary detailed sectional view through the lower section of the detent assembly showing the detent in retracted position.

Figure 6 is a vertical sectional view through the upper section of the assembly.

Figure 7 is a top plan view of the lower section of the assembly.

Figure 8 is a top plan view of the lower section of the assembly.

Figure 9 is a top plan view of the upper section of the assembly.

Figure 10 is a edge elevational view of the detent plate.

Figure 11 is a top plan view of the detent plate.

Figure 12 is a side elevational view of the nut barrel.

Figure 13 is a side elevational view of the screw shaft.

Figure 14 is a front elevational view of the screw shaft.

Figure 15 is a side elevational view of one of the stud bolts.

Figure 16 is an end elevational view of one of the stud bolts.

Figure 17 is a perspective view of the screw shaft head case.

Figure 18 is a fragmentary detailed sectional view on line 18—18 of Figure 17.

Figure 19 is a cross-sectional view on line 19—19 of Figure 20.

Figure 20 is a side elevational view of one of the keys.

Referring to the drawings wherein like numerals designate like parts, it can be seen in Figure 1 that numeral 5 denotes the conventional pedestal brace of the locomotive frame from which rises the pedestal which includes the legs 6 and 7. Numeral 8 denotes the usual drive box which carries a journal bearing 9 mounted on the journal of a driving axle 10.

Shoes 11 and 12 are interposed between the drive box 8 and the legs 6 and 7, respectively, the shoe 11 having the wedge member 11' therein which engages the sloping face 6' of the leg 6 and a liner 6'' is placed between the front face of the leg 6 and the front flange of the shoe 11 as shown in Figures 1 and 4. These parts may be of the conventional or any suitable arrangement.

The lower portion of the wedge member 11', has the T-shaped recess 13 for accommodating the case 14 which is of rectangular shape and having the slot 15 in the bottom thereof through which the depending shank a of the laterally offset T-head 16 of the screw shaft 17 can extend and slide. As can be seen in Figure 4, the case 14 has an upstanding nipple 18 which seats in a recess in the wedge member 11' above the said recess 14.

The screw shaft 17 extends downwardly through a smooth opening in the pedestal brace 5, this shaft having the threaded portion 20 which extends into the detent assembly generally referred to by numeral 21.

In carrying out the present invention, it can be seen that this detent assembly is made up of the upper section 22 and the lower section 23 in conjunction with the detent element 24.

The upper section 22 is of cross-shape, the same having the protruding portions b—b and c—c. Furthermore this upper section 22 has the bore 25 and counterbore 26, which merging defines a seat 27. The bottom side of each of the protruding portions b—b of the section 22 is formed with a recess 28.

The seat 27 accommodates the beveled portion 29 of the head 30 of the nut barrel 31. (See Figure 12.)

Just below the beveled portion 29 of the head 30 is the hexagon-shaped formation 32 and connecting this portion 32 with the hexagon-shaped lower portion 33 is the reduced neck portion 34.

The hexagon-shaped lower portion 33 extends down freely through the opening 35 in the section 23. As shown in Figure 7, this section 23 has openings 36 in the corner portions thereof to accommodate the stud bolts 37. These bolts have the lower threaded portions 38 and the upper threaded portions 39 and the shoulder structure 40 on each for abutting engagement with the underside of the pedestal brace 5 as shown in Figure 4. These stud bolts are screwed into the threaded recesses 41 of the pedestal brace 5 and depend between the portions b and c of the section 22 and through the openings 36 of the section 23. The lower ends of these stud bolts 37 accommodate the notched lock nuts 43 through which cotter keys or other means can be disposed for fastening the nuts 43 in place against displacement. The rectangular parts 40 of the bolts 37 engage the angle corners formed by the parts b and c of the section 22 and thus the bolts are held against turning movement by the parts of said section 22.

The detent element 24 consists of the annulus 44 having the hexagon-shaped opening 45 therein and the laterally extending arms 46—46 apertured as at 47. Disposed through the apertures 47 of the arms 46 are the pintles 48 of the key members generally referred to by 49, each of these key members having a shoulder 50 thereon for abutting engagement with the bottomside of the corresponding arm 46 and with a narrow body portion 51 from which depends the knob structure 52, there being a shoulder structure 53 between the knob structure 52 and the body 51.

The narrow body structures 51 are vertically slidable through the rectangular-shaped slots 54 extending through the bottom of the section 23 and as is shown in Figures 3 and 5, the arms 46 of the detent element 24 are vertically movable in the pockets 55, while the annulus 44 is either circumscribing the hexagon portion 32 of the barrel 31 or the reduced neck 34.

A coiled compression spring 56 is interposed between the shoulder 57 in the bottom of the section 23 and the annulus 44 of the detent member 24 to normally hold the detent member 24 in elevated position with its annulus 44 fitting the hexagon portion 32 of the barrel 31 and the narrow body portions 51 of the keys 49 extending into the rectangular-shaped openings 54 of the section 23. Obviously such construction as this prevents any self-adjusting of the shaft 17.

When it is desired to adjust the shaft 17 by actuating the barrel 31, the keys 49 must be pulled downwardly, compressing the spring to the extent that the annulus 44 of the detent member 24 will be opposed at the neck 34. The keys 49 are then turned a quarter turn to place the flat parts 51 at right angles to the slots 54 in the member 23 so that the keys will hold the member 24 in lowered position as shown in Figure 5. Then after the nut 33 is adjusted the keys 52 are turned back so that their flat parts 51 will pass through the slots 54 as the spring 56 raises the detent member 24 to the position shown in Figure 3 where its non-circular opening 45 will engage the non-circular part 32 of the nut member.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. The combination with a locomotive drive box assembly including a pedestal support and a wedge bearing, a screw shaft for adjusting the wedge bearing, a nut barrel on the screw shaft ridable against the pedestal support and provided with a polygonal portion and a reduced portion adjacent the polygonal portion, a member adapted to embrace the polygonal portion of the barrel or the reduced portion, a key member swivelly connected to the last-mentioned member and adapted to be rotated to hold the last-mentioned member at a position opposed to the reduced portion of the barrel and a stationary part against which a portion of the key member engages when said key member is so rotated and means for normally holding the barrel embracing member in raised position embracing the polygonal portion of the barrel.

2. The combination with a locomotive drive box assembly including a pedestal support and a wedge bearing, a screw shaft for adjusting the wedge bearing, a nut on the screw shaft and engaging the pedestal support, said nut having a reduced exterior part and a non-circular part above the reduced part, supporting means attached to and depending from the pedestal support and encircling the nut and the lower end of which has slots therein, a detent member having a non-circular opening therein which surrounds the nut, spring means for holding the detent member with its opening around the non-circular part of the nut, said detent member being supported for longitudinal movement relative to the nut in the supporting means and keys connected with the detent member and having flat portions passing through the slots, said key members being moved downwardly to move the detent member to place its opening around the reduced part of the nut, after which the key members are turned to place the flat parts at right angles to the slots to hold the detent member in lowered position.

3. The combination with a locomotive drive box assembly including a pedestal support and a wedge bearing, a screw shaft for adjusting the wedge bearing, said shaft passing through a hole in the support, a nut on the screw shaft and bearing against the bottom of the support, a supporting member including upper and lower sections surrounding the nut, means for connecting the upper section to the bottom of the support and the two sections together, the lower section forming a chamber having slots in its bottom, a detent member including a central portion having a non-circular opening therein and outwardly extending arms, said detent member being located in the chamber with the nut passing through the non-circular opening therein, said nut having an exterior reduced part and a non-circular part above the reduced part, spring means for holding the detent member in raised position with its non-circular opening embracing the non-circular part of the nut member, key members rotatably connected with the arms of the detent member and having flat parts thereon passing through the slots for preventing rotary movement of the key members, said key members being pulled downwardly to lower the detent member where its opening will encircle the reduced part of the nut to permit the nut to be turned, the key members being turned to place the flat parts at right angles to the slots to hold the detent member in lowered position.

4. The combination with a locomotive drive box assembly including a pedestal support and a wedge member having a T-shaped opening passing transversely through its lower end, a case in the head part of the opening, said case being of substantially rectangular shape with an opening in its bottom which aligns with the stem part of the T-shaped opening, a stud extending upwardly from the top of the case and engaging a hole in the wedge member, a bolt having a T-shaped head fitting in the case and its stem passing through the opening in the wedge, said stem of the bolt also passing through the pedestal support, a nut on the lower end of the bolt and engaging the under face of the support, spring-pressed detent means for locking the nut in adjusted position and manually operated means for moving the detent means to releasing position against the action of the spring means.

5. The combination with a locomotive drive box assembly including a pedestal support and a wedge bolt, a nut on the bolt having its upper end bearing against the under face of the pedestal support, said nut having a reduced intermediate portion and an enlarged non-circular portion above the reduced part, a supporting member including upper and lower sections surrounding the nut, the upper section being of cross shape to provide angle corner spaces, bolts threaded into the pedestal support and having rectangular shaped intermediate parts fitting in said angle corner spaces with the lower ends of the bolts threaded and passing through the lower section, nuts on the lower ends of the bolts for holding the two sections together and the upper section bearing against the pedestal support, the lower section forming a non-circular chamber having slots in its bottom, a detent member of non-circular shape vertically movable in the chamber and held against rotary movement, said detent member having a non-circular opening therein for fitting over the non-circular part of the nut to hold the nut against turning movement, spring means for holding the detent member in raised position with its non-circular opening in engagement with the non-circular part of the nut, finger engaging members movably connected with the detent member and extending downwardly through the slots for lowering the detent member and a projection on each finger engaging member for engaging a bottom part of the lower section when the finger engaging member is turned after being pulled downwardly, for holding the detent member in lowered position.

6. In combination with a locomotive wedge adjusting bolt, a nut on the bolt having an enlarged non-circular upper portion and a reduced intermediate portion and a wrench receiving part below the reduced portion, a stationary housing through which passes the upper and intermediate parts of the nut with the wrench engaging part extending from the housing, a member supported for vertical movement in the housing and held against rotary movement, said member having a non-circular opening therein for fitting over the non-circular part of the nut to prevent turning of the nut, means for normally holding said vertically movable member in raised position to prevent turning movement of the nut and manually actuated latch means for moving the member downwardly and to hold it in lowered position with its opening surrounding the reduced part of the nut to permit turning movement of the nut.

JUNIUS H. JONES.